United States Patent [19]
Furlani et al.

[11] Patent Number: 6,044,042
[45] Date of Patent: Mar. 28, 2000

[54] METHOD AND APPARATUS FOR INVERTING A BIAS FIELD FOR MAGNETO-OPTIC RECORDING AND ERASING

[75] Inventors: Edward P. Furlani, Lancaster; Christopher C. Williams, Livonia; Syamal K. Ghosh, Rochester, all of N.Y.

[73] Assignee: Eastman Kodak Company, Rochester, N.Y.

[21] Appl. No.: 09/045,097

[22] Filed: Mar. 20, 1998

[51] Int. Cl.[7] .................................................. G11B 11/00
[52] U.S. Cl. .............................................. 369/13; 360/114
[58] Field of Search ............................ 369/13, 14, 116, 369/110; 360/114, 59

[56] References Cited

U.S. PATENT DOCUMENTS

| | | | |
|---|---|---|---|
| 4,972,337 | 11/1990 | Eguchi et al. | 369/13 |
| 5,490,124 | 2/1996 | Oliver et al. | 369/13 |
| 5,535,181 | 7/1996 | Furlani et al. | 369/13 |
| 5,570,329 | 10/1996 | Furlani | 369/13 |
| 5,691,965 | 11/1997 | Jansen et al. | 369/44.14 |

*Primary Examiner*—Tan Dinh
*Attorney, Agent, or Firm*—Peyton C. Watkins

[57] ABSTRACT

A bias-field apparatus for a magneto-optical system having a magneto-optical recording element which includes a conductive substrate and which moves through a magnetic field created by the bias-field device so that information is selectively recorded on or erased from the recording element, the device comprising: a support member; a magnet mounted for rotation in the support member such that when the recording element rotates the conductive substrate creates a magnetic coupling with the magnet for causing said magnet to rotate; and a ferromagnetic element having a coil disposed thereon that releases said magnetic for rotation when the coil is energized, and prevents rotation when said coil is de-energized for permitting said magnet to be selectively rotated.

8 Claims, 3 Drawing Sheets

METHOD AND APPARATUS FOR INVERTING A BIAS FIELD FOR MAGNETO-OPTIC RECORDING AND ERASING

CROSS-REFERENCE TO RELATED APPLICATIONS

This application is related to U.S. application Ser. No. 08/800,347 entitled "A Motorless Bias-Field Device and Method having Magnetic Coupling Between A Magnet and the Recording Element for Inverting the Magnetic Field" by Christopher Williams et. al.

FIELD OF THE INVENTION

The invention relates generally to the field of magneto-optic recording and erasing and, more particularly, to such recording and erasing utilizing a motorless bias-field device for selectively inverting a bias field for permitting such recording and erasure.

BACKGROUND OF THE INVENTION

In the magneto-optic recording process, a vertically magnetizable recording layer is initially sensitized by simultaneously subjecting it to a uniform magnetic field and a temperature which exceeds its Curie temperature. The magnetic field, being directed perpendicular to the recording layer, serves to uniformly align all of the magnetic domains therewith. Once all the magnetic domains are facing in the same direction, the recording layer is ready to record information. Such recording is effected by subjecting the recording layer to a magnetic field of reverse polarity while scanning the layer with an intensity-modulated laser beam.

During the recording process, a laser beam intensity is switched between high and low levels, representing the digital (binary) information being recorded. Only the high level is sufficiently intense to raise the temperature of the irradiated portion of the recording layer to above its Curie temperature; thus, digital information is recorded at the point of incidence of the laser as the more intensely irradiated magnetic domains flip in orientation to align themselves with the magnetic bias field. Playback of the recorded information is commonly achieved by scanning the information tracks with a plane-polarized beam of radiation and monitoring the reflected beam for shifts in the plane of polarization, as produced by the well known Kerr effect. To erase the recorded information, the polarity of the applied external magnetic field is reversed, and the recording layer is scanned with a beam of sufficient intensity to again heat the recording layer to above its Curie temperature. After this erasure step, all of the irradiated magnetic domains will again face in the same direction.

Various schemes have been proposed to achieve the magnetic field inversions required in switching between the record and erase modes of the magneto-optic recording process. In the disclosures of U.S. Pat. Nos. 5,020,042 and 5,291,345, for example, the field inversion apparatus consists of a magnetic field producing coil surrounding a cylindrical bipolar magnet. One pole of the magnet is placed adjacent the recording medium for inducing its particular magnetic field to the recording medium, and when the coil is energized, the field that the coil creates imparts a torque to the magnet forcing it to rotate for causing the other pole of the magnet to be adjacent the recording medium.

Although the presently known and utilized device is satisfactory, it is not without drawbacks. The coils are not energy efficient because they consume a substantial amount of energy.

Consequently, a need exists in the construction and mode of operating the bias-field device.

SUMMARY OF THE INVENTION

The present invention is directed to overcoming one or more of the problems set forth above. Briefly summarized, according to one aspect of the present invention, the invention resides in a bias-field apparatus for a magneto-optical system having a magneto-optical recording element which includes a conductive substrate and which moves through a magnetic field created by the bias-field device so that information is selectively recorded on or erased from the recording element, the device comprising: (a) a support member; (b) a magnet mounted for rotation in the support member such that when the recording element rotates the conductive substrate creates a magnetic coupling with the magnet for causing said magnet to rotate; and (c) a ferromagnetic element having a coil disposed thereon that releases said magnetic for rotation when the coil is energized, and prevents rotation when said coil is de-energized for permitting said magnet to be selectively rotated.

It is an object of the present invention to provide a bias-field device for overcoming the above-described drawbacks.

It is also an object of the present invention to provide an energy efficient and motorless bias field device.

It is an advantage of the present invention to provide a cost efficient bias-field device.

It is a further advantage of the present invention to provide a bi-directional bias-field device for selectively inverting the magnetic bias field.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
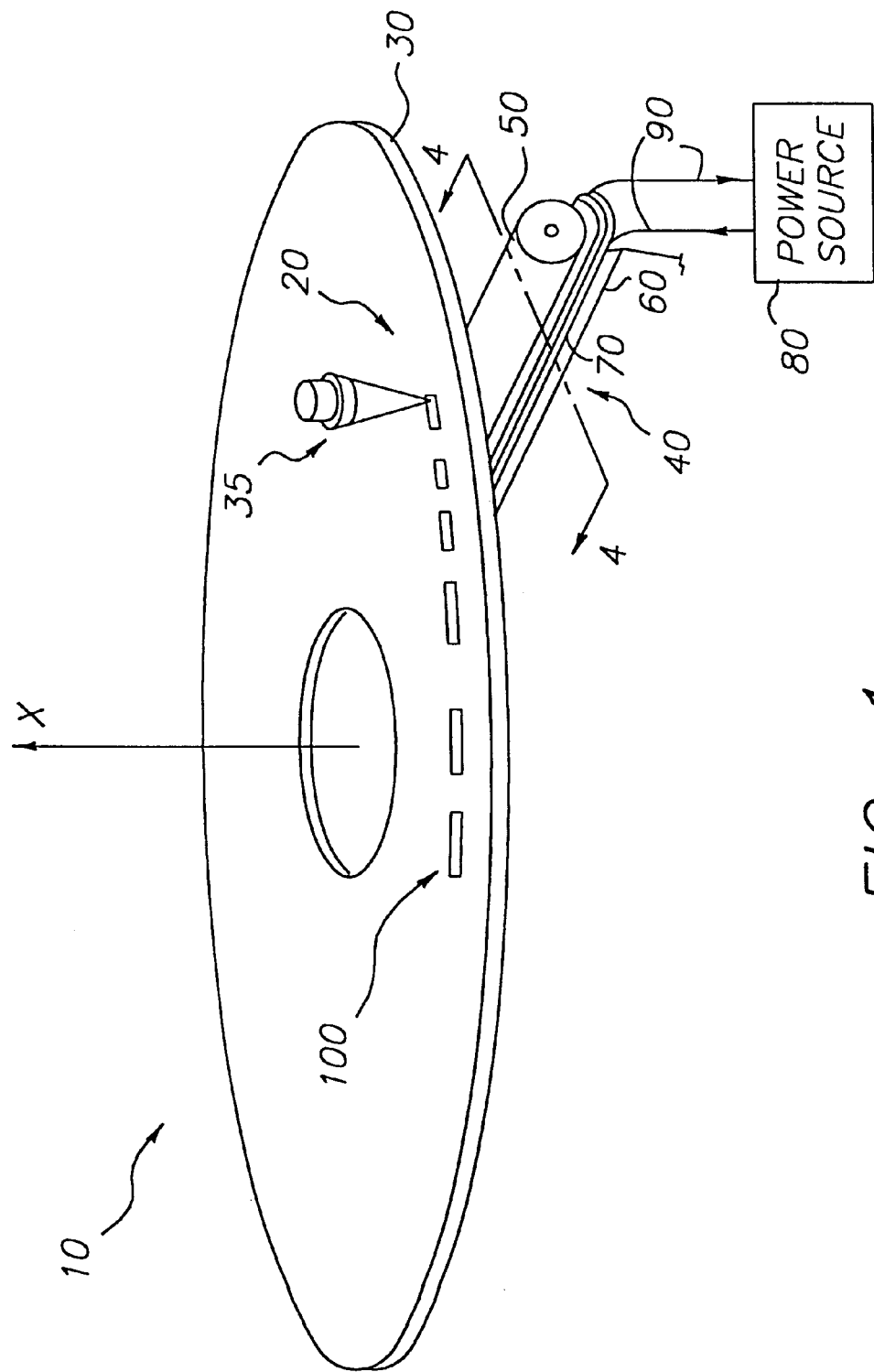
FIG. 1 is a perspective view of the bias field apparatus of the present invention.

Referring to FIG. 1, there is illustrated a magneto-optic recording element as shown in the form of a disk 10 which is adapted to be rotated about its central axis x. The essential features of the recording element are a vertically magnetizable recording layer 20 and a supporting substrate 30. The supporting substrate is made of a conductive material, preferably aluminum. During the recording step, the recording layer 20 is selectively heated by a beam of radiation, as provided by a laser source 35. The beam intensity is modulated by an information source (not shown) representing certain digital information which is to be recorded. The information source functions to switch the beam intensity of the laser source 35 between high and low levels, only the high level being sufficient to heat the recording layer 20 to at least its Curie temperature. A bias field device 40 includes a magnet 50, a ferromagnetic element 60, a support member 65 (not shown, see FIG. 2), and a coil 70. A power source 80 is electrically connected to the coil 70 via wires 90 for supplying current to the coil 70. The magnet 50 has both north and south poles oriented along its cross-sectional dimension (only the north pole is shown), and is radially disposed with respect to the rotating disk 10 for providing a magnetic bias field at recording layer 20. Although the preferred embodiment illustrates a magnet with one north and one south pole, the magnet may include a plurality of north and south poles. The magnet 50 is mounted for rotational movement, as will be described in detail below, so that the direction of the field under the desired location on the recording medium 10 may be switched from the downward direction in which one pole of magnet 50 (for example the north pole) is beneath the write/erase spot on recording layer 20 to an upward direction in which the magnet 50 is rotated so that south pole of magnet 50 is beneath the write/erase spot on recording layer 20. The reversal of poles of magnet 50 will cause magnetic domains in the recording element to flip orientations, e.g., from upward to downward, whenever the laser beam intensity is at its high level. In this manner, the digital information 100 provided by the laser source 35 is magnetically recorded in the recording layer 20.

To erase the previously recorded information in the recording layer 20, the direction of the magnetic bias field is inverted. After such field inversion, the laser source 35 scans the recording element while its intensity is maintained at its high level. While so radiated, all of the magnetic domains align themselves with the bias field thereby providing a uniformly sensitized disk or track which is again ready to record information.

Figure 2A:
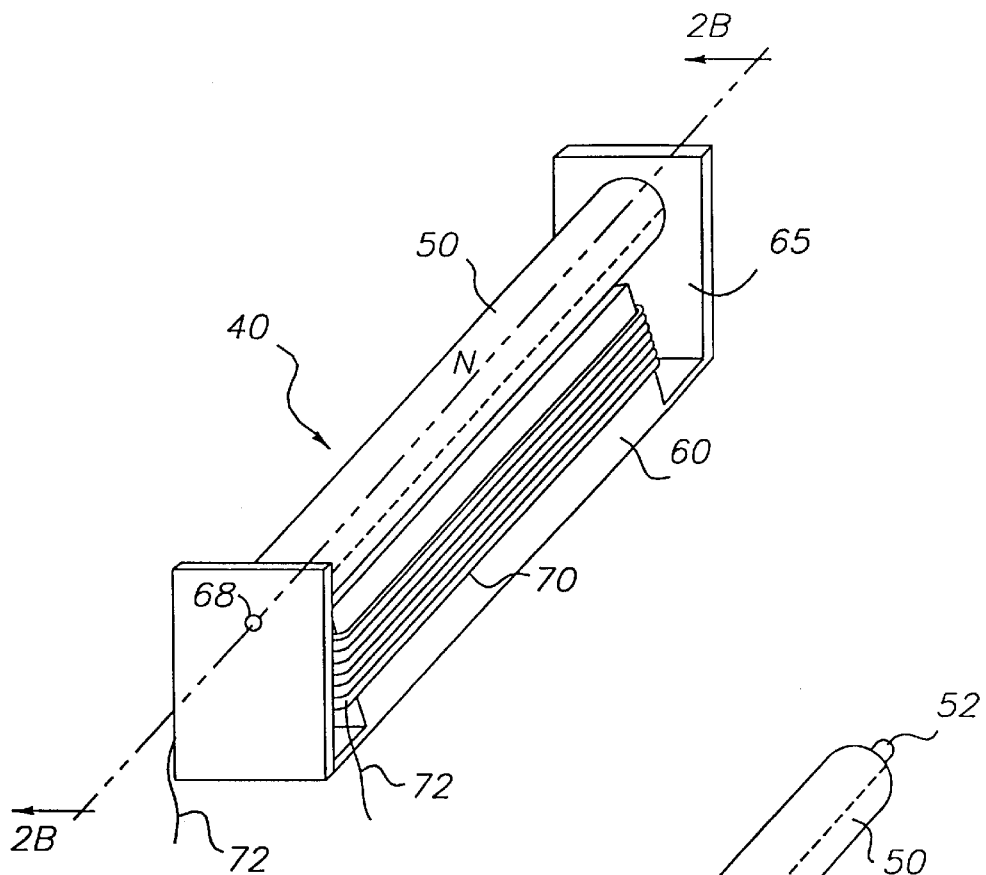
FIG. 2A is a perspective view of the bias field device of the present invention.
Figure 2B:
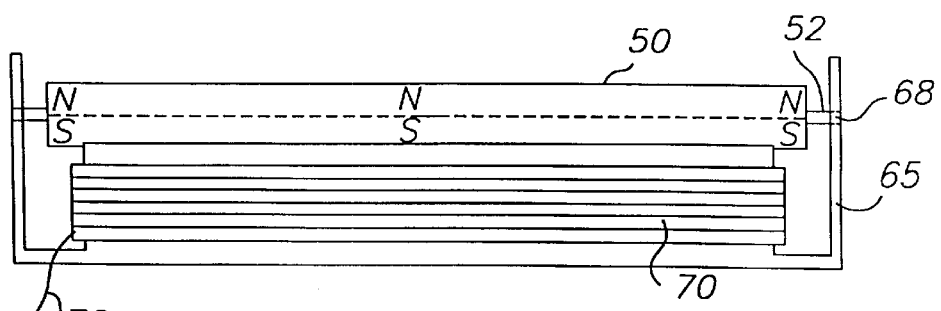
FIG. 2B is a cross-sectional view of the bias field device taken along line 2B—2B of FIG. 2A.

Referring to FIGS. 2A and 2B, the bias field device 40 is shown in a perspective view and cross-sectional view taken along lines 2B—2B of FIG. 2A, respectively. The bias field device 40 comprises a magnet 50 with attached axle members 52 (FIG. 3), a ferromagnetic element 60, a support member 65, and a coil 70. The ferromagnetic element 60 is preferably formed from a soft magnetic material including either permalloy, supermalloy, sendust, iron, nickel, nickel—iron or alloys thereof.

Figure 3:
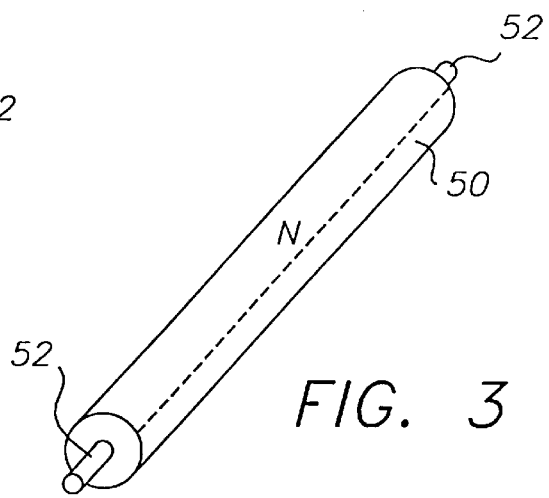
FIG. 3 is a perspective view of the bias magnet.

The magnet 50 with attached axle members 52 is mounted for rotation in support member 65 with axle members 52 supported in bearings 68. The coil 70 is wrapped around the ferromagnetic element 60 and has terminal ends 72 which are connected to power source 80 via wires 90 (FIG. 1). Referring to FIG. 3 a perspective view is shown of magnet 50 with attached axis members 52.

Figure 4A:
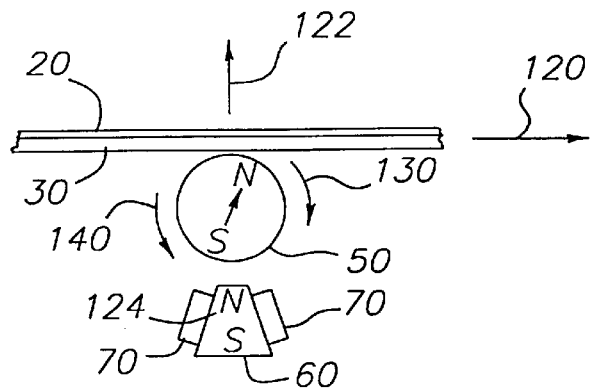
FIG. 4A is a cross-sectional view of the bias field apparatus taken along line 4—4 of FIG. 1. This view shows the bias magnet in a first bias position.
Figure 4B:
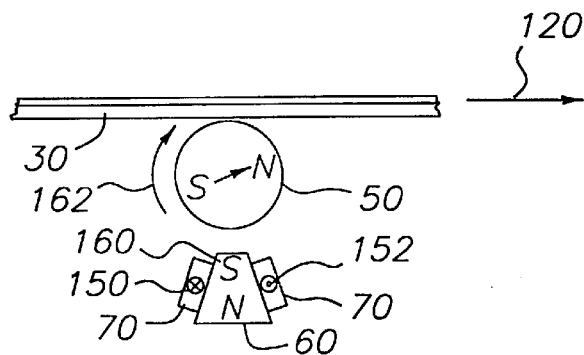
FIG. 4B is a cross-sectional view of the bias field device taken along line 4—4 of FIG. 1. This view shows the bias magnet undergoing rotation from a first to a second bias position.
Figure 4C:
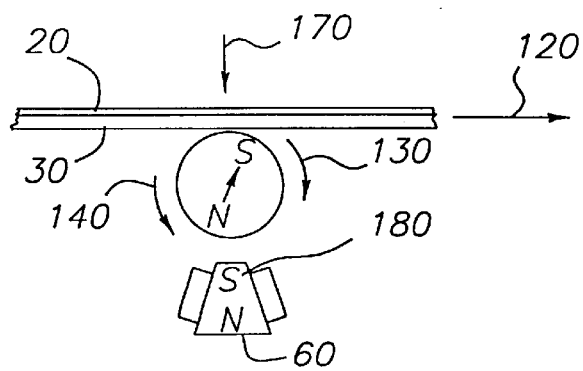
FIG. 4C is a cross-sectional view of the bias field apparatus taken along line 4—4 of FIG. 1. This view shows the bias magnet in a second bias position.

FIGS. 4A, 4B and 4C are cross-sectional views of the bias field apparatus taken along line 4—4 of FIG. 1 illustrating the operation and field inversion of the bias field device 40. For purposes of illustration, the disk 10 is rotating in the direction illustrated by the arrow 120. The magnet 50 is in a first bias position with its north pole adjacent to the disk 10 thereby producing an upward directed magnetic field across recording layer 20 as indicated by field vector 122. The south pole of the magnet 50 is adjacent to the ferromagnetic element 60 thereby inducing a north pole 124 in ferromagnetic element 60. The rotation of disk 10 causes the conductive substrate 30 to impart a first torque on the magnet 50 which tends to rotate the magnet 50 clockwise as illustrated by rotation arrow 130. The magnet 50 is held stationary in the first bias position by the presence of the north pole 124 of ferromagnetic element 60 which imparts a second torque that tends to rotate the magnet counterclockwise as indicated by the rotation arrow 140. The first and second torques are of equal magnitude and therefore there is no rotation of magnet 50. It is important to note that coil 70 is de-energized when it is desired to have the magnet 50 stationary.

When rotation of the magnet 50 is desired, the coil 70 is energized as shown in FIG. 4B. The current flows through the coil 70 as indicated by conventional current arrows 150 and 152 with current arrow 150 indicating that current is going into the page and current arrow 152 indicating that current is going out of the page. This current induces a south pole 160 in ferromagnetic element 60. The south pole 160 and rotation of conductive substrate 30 both impart a torque to magnet 50 rotating it in a clockwise direction as indicated by rotation arrow 162. Therefore, the magnet 50 undergoes rotation from the first bias position with its north pole adjacent to disk 10 to a second bias position with is south pole adjacent to disk 10 as shown in FIG. 4C. The current is on just long enough to implement the rotation.

Referring to FIG. 4C, the magnet 50 is in a second bias position with its south pole adjacent to the disk 10 thereby producing an downward directed magnetic field across recording layer 20 as indicated by field vector 170. The north pole of the magnet 50 is adjacent to the ferromagnetic element 60 thereby inducing a south pole 180 in ferromagnetic element 60. The rotation of disk 10 causes the conductive substrate 30 to impart a first torque on the magnet 50 which tends to rotate the magnet 50 clockwise as illustrated by rotation arrow 130. The magnet 50 is held stationary in the second bias position by the presence of the south pole 180 of ferromagnetic element 60 which imparts a second torque that tends to rotate the magnet counterclockwise as indicated by the rotation arrow 140. The first and second torques are of equal magnitude and therefore there is no rotation of magnet 50. It is important to note that coil 70 is de-energized when it is desired to have the magnet 50 stationary. It is obvious to those skilled in the art that the magnet can be rotated to its first bias position with its north pole adjacent to the disk 10 by energizing the coil as described in FIG. 4B with the direction of current opposite to that shown in FIG. 4B.

The invention has been described with reference to a preferred embodiment. However, it will be appreciated that variations and modifications can be effected by a person of ordinary skill in the art without departing from the scope of the invention.

Parts List:
  10 disk
  20 recording layer
  30 substrate
  35 laser source
  40 bias field device
  50 magnet
  52 axle members
  60 ferromagnetic element
  65 support member
  70 coil 80 power source
90 wires
100 recorded spot
120 arrow
122 field vector
124 north pole
130 rotation arrow
140 rotation arrow
150 current arrow
160 south pole
162 rotation arrow
170 field vector
180 south pole

What is claimed is:

1. A bias-field apparatus for a magneto-optical system having a rotatable magneto-optical recording element which includes a conductive substrate which moves through a magnetic field created by the bias-field device so that information is selectively recorded on or erased from the recording element, the device comprising:

(a) a support member;

(b) an elongated magnet radially disposed with respect to an axis of rotation of the recording element and mounted for rotation in said support member such that when the recording element rotates the conductive substrate creates a magnetic coupling with the magnet for causing said magnet to rotate;

(c) an elongated ferromagnetic element having a coil disposed thereon, said ferromagnetic element positioned in parallel relation to the magnet such that a magnetic pole is induced in the ferromagnetic element adjacent the magnet that prevents rotation of the magnet when said coil is de-energized; and (d) a power source for briefly energizing the coil to reverse the magnetic pole induced in the ferromagnetic element and to implement the onset of rotation, thereby releasing the magnet for rotation to permit the magnet to be selectively rotated due to the magnetic coupling between the conductive substrate and the magnet.

2. The bias field device as in claim 1, wherein said ferromagnetic element is formed from a soft magnetic material from the group consisting of permalloy, supermalloy, sendust, iron, nickel, nickel—iron or an alloy of any member of this group.

3. The bias field device as in claim 2, wherein direction of rotation of said magnet is dependent on the direction of rotation of the recording element.

4. The bias field device as in claim 1, wherein said conductive substrate is a conductive metal.

5. The bias field device as in claim 4, wherein said magnet is bipolar.

6. The bias field device as in claim 4, wherein said magnet includes a plurality of poles.

7. A method for operating a bias-field device for a magneto-optical system having a magneto-optical recording element which moves through a magnetic field created by the bias-field device so that information is selectively recorded on or erased from the recording element, the method comprising the steps of:

(a) providing a rotatable magneto-optical recording element with a conductive substrate;

(b) providing a support member;

(c) mounting an elongated magnet for rotation about its longitudinal axis in the support member so that the magnet is radially disposed with respect to an axis of rotation of the recording element such that when the recording element rotates the conductive substrate creates a magnetic coupling with the magnet for causing said magnet to rotate;

(d) providing a ferromagnetic element having a coil disposed thereon adjacent the recording element such that the element is in parallel relation to the magnet and a magnetic pole is induced in the ferromagnetic element adjacent the magnet that prevents rotation of the magnet when said coil is de-energized; and (e) energizing the coil to reverse the magnetic pole induced in the ferromagnetic element and thereby release the magnet for rotation to permit the magnet to be selectively rotated.

8. The method as in claim 7, wherein step (a) includes rotating the magnet in the direction of rotation of the conductive substrate.

* * * * *